United States Patent [19]
Kennedy et al.

[11] Patent Number: 5,365,235
[45] Date of Patent: Nov. 15, 1994

[54] METHOD AND APPARATUS FOR REDUCING RESIDUAL RF POWER IN A TRANSMITTER/RECEIVER ANTENNA

[75] Inventors: John F. Kennedy, Dearborn; Lawrence P. Kirk, Canton; Gregory A. Marek, Livonia, all of Mich.

[73] Assignee: Ford Motor Company, Dearborn, Mich.

[21] Appl. No.: 116,840

[22] Filed: Sep. 7, 1993

[51] Int. Cl.$^5$ .................. G01S 13/76; H04B 1/44
[52] U.S. Cl. .................. 342/44; 340/825.54; 342/175; 455/78
[58] Field of Search .......... 342/44, 175, 198; 455/78; 340/572, 825.54

[56] References Cited

U.S. PATENT DOCUMENTS 3,740,742  6/1973  Thompson et al.
3,777,267  12/1973  Van der Floe et al. ............ 340/572
4,058,742  11/1977  O'Brien ............................ 307/260
5,025,492  6/1991  Viereck .
5,053,774  10/1991  Schuermann et al. ............ 342/44
5,055,835  10/1991  Sutton ............................ 340/825.54

Primary Examiner—Gilberto Barrón, Jr.
Attorney, Agent, or Firm—Mark L. Mollon; Roger L. May; Kevin G. Mierzwa

[57] ABSTRACT

A method and apparatus for interrogating a transponder using a single transmitter-receiver antenna transmits an interrogation signal to the transponder. The transmit signal has two segments; a first segment for energizing the transmitter-receiver antenna and a second segment having a second phase for cancelling energy in the transmitter-receiver antenna. The amount of energy is reduced before the transponder transmits a response signal.

19 Claims, 2 Drawing Sheets

METHOD AND APPARATUS FOR REDUCING RESIDUAL RF POWER IN A TRANSMITTER/RECEIVER ANTENNA

BACKGROUND OF THE INVENTION

The invention relates generally to communications between a transponder and a transmitter-receiver antenna and more specifically to reducing the residual power remaining in a transmitter-receiver coil after transmitting an interrogation signal to the transponder.

In applications such as automotive burglar alarms, it is desirable to use a single coil to transmit a relatively high power interrogation signal to energize a transponder carried by a particular individual. The transponder lacks its own power source but uses the power in the interrogation signal to transmit a relatively low power response signal to the transmitter-receiver coil. The response signal contains information such as an identification code.

One problem associated with such a system is that residual power remains in the coil even after the coil is no longer driven with the interrogation signal. This remaining residual power takes time to decay from the transmitter/receiver coil. If the response signal arrives at the coil before the remaining residual power in the coil is adequately reduced, the response signal can be corrupted or undetectable.

U.S. Pat. No. 5,025,492 uses a damping circuit to reduce the power in the antenna. The circuit, comprised of a switch and several resistors, is adapted to be connected to the antenna after sending an interrogation signal and disconnected before receiving a response signal. However, the addition of several components and the increased board size increase the cost of the system. Another problem with using additional components is that heat is generated by the additional components which must be removed.

SUMMARY OF THE INVENTION

An advantage of the invention is that it provides a reduction in the residual energy in the transmitter-receiver coil after a transmission without additional components.

Briefly, a preferred embodiment of the invention includes generating a first transmission signal having a first phase for a time interval which energizes a transponder. A second transmission signal is generated after the first transmission signal having a second phase which at least partially reduces the residual energy from the antenna coil so that an RF signal can thereafter be received on the antenna coil from the transponder.

DETAILED DESCRIPTION OF THE PREFERRED EMBODIMENT

Figure 1:
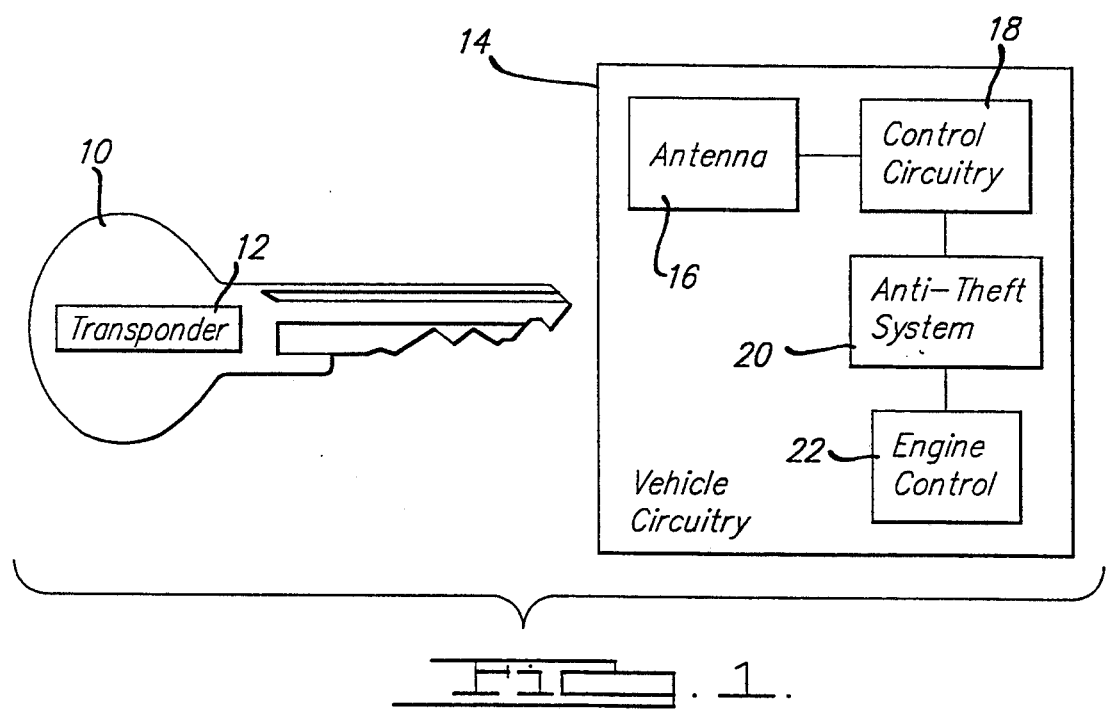
FIG. 1 is a block diagram of a preferred embodiment of as applied to a vehicle security system.

Referring now to FIG. 1, antenna 16 in a vehicle circuitry system 14 communicates with a transponder 12 encapsulated in the head of a key 10 or other containment device such as a key fob. Security system 14 generates an interrogation signal which is received by transponder 12 and which is converted to a power supply voltage to activate transponder 12. Using the passively generated voltage, the transponder transmits a response signal to antenna 16 containing an ID code.

Security system 14 comprises antenna 16, control circuitry 18, antitheft system 20, and engine control 22. Antenna 16 is a single antenna located in close proximity to the ignition lock cylinder (not shown) for both transmitting and receiving RF signals. Antenna 16 is activated by control circuitry 18 in response to the turning of key 10 to the on position of the lock cylinder. Antenna 16 generates a high energy interrogation signal burst to energize and interrogate transponder 12.

Control circuitry 18 is coupled to antitheft system 20 and to engine control 22. If the proper response signal (ID code) is not received from transponder 12, antitheft system 20 activates an alarm (not shown) and/or disables engine control 22 to prevent operation of the ignition circuit (not shown).

Figure 2:
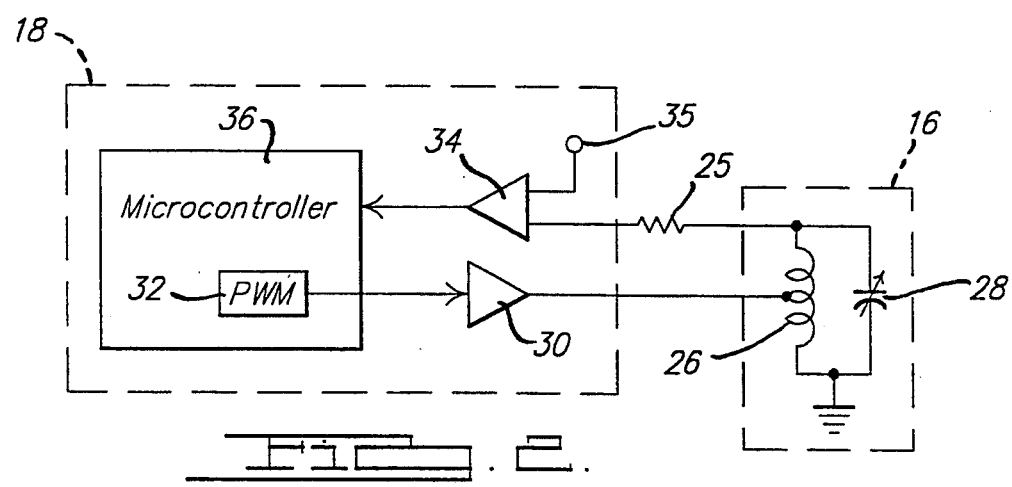
FIG. 2 is a schematic diagram of the antenna circuit and the control circuit.

Referring now to FIG. 2, antenna 16 comprises a tapped coil 26 in parallel with a tank 28 (preferably comprised of a capacitor). Control circuit 18 comprises a coil driver 30, a pulse width modulator 32, a comparator 34 and a microcontroller 36. Control circuit 18 can be comprised of individual components or be incorporated into one integrated circuit.

Pulse width modulator 32 provides a pulsed signal to driver 30 which proportionally drives antenna 16. Energy is stored in tank 28 until a sufficient amount of energy builds to transmit an interrogation signal.

Comparator 34 has one input coupled to tapped coil 26 via a resistor 25 and a second input coupled to a reference voltage 35. The reference voltage can be any voltage low enough to prevent errors, for example 15 mv. Comparator 34 provides a signal to microcontroller 36 if the voltage in the antenna coil 26 exceeds the reference voltage threshold. Alternatively, microcontroller 36 may include an analog-to-digital converter, thus allowing the comparison to the threshold to be performed by software.

Figure 3:
FIG. 3 is a signal diagram showing the signals present in the circuit of FIG. 2.
Figure 3:
Figure 3:
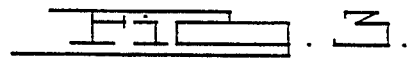
Figure 4:
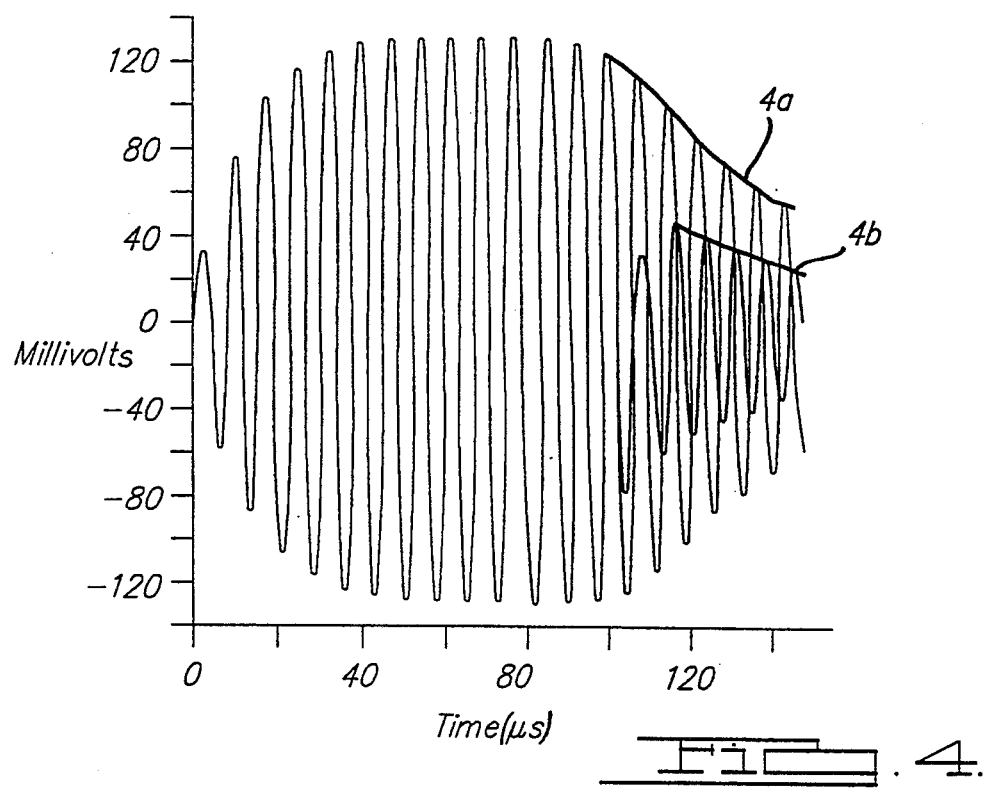
FIG. 4 is a signal diagram showing the reduction of residual energy achieved by the present invention.

Referring now to FIG. 3, a typical pulsed interrogation signal 3a has a cycle period of 7.4 $\mu$s and a total duration of 50 ms. The resulting antenna voltage is shown in FIG. 4a. In order to receive a signal in the tank without corruption, the voltage in the tank should be below a threshold of 15 mv before the transponder returns a signal. The transponder begins transmitting its response signal which typically takes 1 ms.

To insure the antenna voltage is below 15 mv. within 1 ms, the pulse width modulator generates a control signal with phase inversion. In the preferred embodiment depicted in 3b, the interrogation signal with phase inversion is comprised of two segments; a first segment A is the standard interrogation signal (e.g., 3a) and a second segment B is the last three series of pulses of the control signal which are phase-shifted to be 180 degrees out of phase with the original interrogation signal. Phase inversion reduces the residual energy in the tank as shown in FIG. 4b. Segment B preferably comprises about three pulses to produce a reliable drop of the antenna voltage in the desired range within the desired amount of time. Other variations for segment B are possible.

An alternative technique for phase inversion uses the comparator to provide feedback control to the microcontroller. The comparator continuously compares the voltage of the antenna with a threshold voltage. If the antenna voltage falls below the threshold, the comparator signal changes level. The microcontroller provides phase inverted pulses to the tank until the comparator indicates an antenna voltage below a desired threshold. The pulse width of the segment B pulses can also be varied to reduce the antenna voltage more rapidly. For example, when energy reduction in the antenna is desired, the pulse width modulator can generate a wide pulse width and continually decrease its width as the antenna voltage drops.

In another variation, the voltage of the antenna can be directed directly to an input of the microcontroller thus eliminating the comparator.

Yet another variation eliminates the pulse width modulator and provides cancellation in the form of a signal with a 180 degree phase difference and with a varying amplitude from the original control signal. The signal is produced directly from the microcontroller to have a steadily decreasing amplitude corresponding to a decrease in the antenna voltage which is received through a comparator or as a direct input to the microcontroller. The microcontroller calculates the desired output to effectuate the biggest reduction in the voltage of the antenna without overdamping the voltage.

Figure 5:
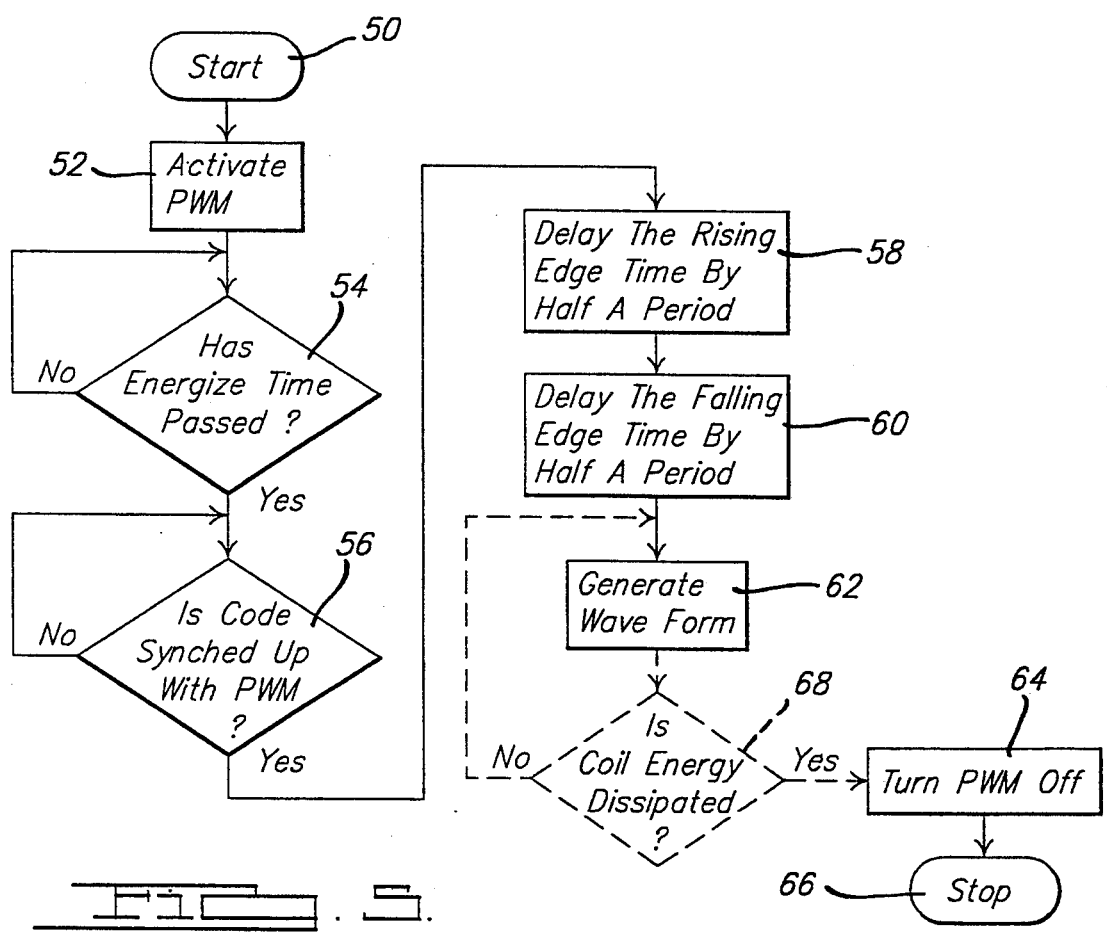
FIG. 5 is a flowchart of a preferred method for reducing the residual energy in an antenna.

Referring now to FIG. 5, a preferred method of the invention begins in step 50. The pulse width modulator is activated in step 52, resulting in the antenna being driven with segment A of the interrogation signal. In step 54, the segment A is generated until the energization time has passed (e.g., 50 ms). When the energization time has passed, the interrogation signal is checked for synchronization against the signal intended by pulse width modulator through the use of feedback to the microcontroller. The interrogation signal will continue to be generated until the interrogation signal matches the signal intended by the microcontroller. Once the signal is synchronized, the rise time is delayed by half a period and the fall time is delayed by half a period as shown in seeps 58 and 60, respectively. The delayed waveform (i.e., segment B) is generated in step 62. The pulse width modulator is turned off in step 64. The process ends in step 66.

An optional step, step 68, can be provided to check if the energy (i.e., voltage) in the antenna has dropped below the threshold. If the antenna voltage is not below a certain threshold, inverted waveforms will continue to be generated in step 62.

In operation, the system is transparent to the user. If, for example, the system is used in a security system for an automobile, the transponder can be located within the head of a key. When the vehicle operator places the key in the ignition, the control circuitry is activated causing the antenna to generate an interrogation signal. The transponder responds and if the right code is generated the ignition circuit is allowed to engage and the engine allowed to start.

What is claimed is:

1. A method for interrogating a transponder using a single transmit-receive antenna, comprising the steps of:

generating a first transmission signal having a first phase for a time interval which energizes said transponder;

generating a second transmission signal after said first transmission signal having a second phase which reduces residual energy in said antenna; and receiving an RF signal on said antenna from said transponder.

2. The method of claim 1 further comprising the steps of:

sensing the energy in said antenna;

deactivating said second transmission signal after said energy in said antenna is reduced below a predetermined threshold.

3. The method of claim 2 further comprising the steps of generating said second transmission signal as a series of pulses having a successively decreasing energy level until said energy level in said antenna means is below said predetermined threshold.

4. The method of claim 3 wherein said second transmission signal is pulse width modulated.

5. The method of claim 3 wherein said second transmission signal is amplitude modulated.

6. The method of claim 1 wherein said second transmission signal is 180 degrees out of phase from said first transmission signal.

7. Apparatus for reducing residual power in a transmitter-receiver antenna, comprising:

antenna means for transmitting and receiving RF signals;

driving means, electrically connected to said antenna, for providing energy to said antenna; and control means, electrically connected to said driving means, for controlling the operation of said driving means by generating a transmission signal;

said transmission signal having two segments, a first segment having a first phase followed by a second segment having a second phase different from said first phase so that said second segment reduces the energy remaining in said antenna means after said first segment.

8. The apparatus of claim 7 further comprising a receiving means, electrically connected to said antenna means and said control means, for receiving a signal corresponding to the energy in said antenna means.

9. The apparatus of claim 8, wherein said control means generates said second segment until the energy received by said receiving means drops below a predetermined level.

10. The apparatus of claim 9, wherein said predetermined level corresponds to a 15 mv antenna voltage.

11. The apparatus of claim 7, wherein said second segment is 180 degrees out of phase from said first segment.

12. The apparatus of claim 7, wherein said second segment is comprised of pulses.

13. The apparatus of claim 12, wherein said second segment is comprised of three pulses.

14. The apparatus of claim 7, wherein said second segment is 180 degrees out of phase from said first segment of said transmit control signal.

15. The apparatus of claim 7, wherein said second segment consists of a sequence of pulses having a decreasing width.

16. The apparatus of claim 7, wherein said antenna comprises a tapped coil and a power tank circuit.

17. The apparatus of claim 7, wherein said driving means includes a coil driver.

18. The apparatus of claim 7, wherein said receiving means includes a comparator for generating a voltage signal when the energy level from said antenna corresponds to a predetermined level.

19. The apparatus of claim 7, wherein said driving means comprises a pulse width generator.

* * * * *